United States Patent
Pietarinen et al.

(10) Patent No.: US 12,139,649 B2
(45) Date of Patent: Nov. 12, 2024

(54) METHOD FOR PRODUCING A BINDER COMPOSITION, BINDER COMPOSITION, AND WOOD PRODUCT

(71) Applicant: UPM-KYMMENE CORPORATION, Helsinki (FI)

(72) Inventors: Suvi Pietarinen, Lappeenranta (FI); Okko Ringena, Neusass (DE); Kati Oinonen, Imatra (FI); Sanna Valkonen, Augsburg (DE)

(73) Assignee: UPM-KYMMENE CORPORATION, Helsinki (FI)

( * ) Notice: Subject to any disclaimer, the term of this patent is extended or adjusted under 35 U.S.C. 154(b) by 81 days.

(21) Appl. No.: 17/693,140

(22) Filed: Mar. 11, 2022

(65) Prior Publication Data
US 2022/0195272 A1    Jun. 23, 2022

Related U.S. Application Data

(62) Division of application No. 16/274,429, filed on Feb. 13, 2019, now Pat. No. 11,453,810, which is a (Continued)

(30) Foreign Application Priority Data
Mar. 29, 2012    (FI) .................................... 20125358

(51) Int. Cl.
C07G 1/00       (2011.01)
C08G 8/20       (2006.01)
(Continued)

(52) U.S. Cl.
CPC ............ *C09J 197/005* (2013.01); *C07G 1/00* (2013.01); *C08G 8/20* (2013.01); *C08G 8/24* (2013.01);
(Continued)

(58) Field of Classification Search
None
See application file for complete search history.

(56) References Cited

U.S. PATENT DOCUMENTS 3,210,240 A    10/1965  Read
3,227,667 A    1/1966   Moffitt
(Continued)

FOREIGN PATENT DOCUMENTS

CA    1084829 A    9/1980
CA    1117693 A    2/1982
(Continued)

OTHER PUBLICATIONS

Comparison study of lignin-kraft extraction process from black liquor using centrifuge and thermal acid hydrolysis methods (Year: 2004).*

(Continued)

*Primary Examiner* — Peter A Salamon
(74) *Attorney, Agent, or Firm* — NIXON PEABODY LLP

(57) ABSTRACT

The present invention relates to a method for increasing the reactivity of lignin, wherein the method comprises the following steps: a) forming, under heating at a temperature of 30-70° C., an aqueous dispersion comprising alkali and lignin, wherein the alkali comprises a hydroxide of an alkali metal; and b) heating the dispersion formed in step a) at a temperature of 50-95° C. for producing alkalated lignin.

5 Claims, 2 Drawing Sheets

Related U.S. Application Data division of application No. 15/251,509, filed on Aug. 30, 2016, now Pat. No. 10,246,619, which is a division of application No. 14/351,701, filed as application No. PCT/FI2013/050353 on Mar. 28, 2013, now Pat. No. 9,464,219.

(51) Int. Cl.

| | | |
|---|---|---|
| *C08G 8/24* | (2006.01) | |
| *C08H 7/00* | (2011.01) | |
| *C08L 97/00* | (2006.01) | |
| *C08L 97/02* | (2006.01) | |
| *C09J 161/12* | (2006.01) | |
| *C09J 197/00* | (2006.01) | |

(52) U.S. Cl.
CPC .............. *C08H 6/00* (2013.01); *C08L 97/005* (2013.01); *C08L 97/02* (2013.01); *C09J 161/12* (2013.01)

(56) References Cited

U.S. PATENT DOCUMENTS

| | | | |
|---|---|---|---|
| 3,395,033 A | | 7/1968 | Remer |
| 3,658,638 A | | 4/1972 | Ludwig et al. |
| 4,017,430 A | | 4/1977 | Briggs |
| 4,113,675 A | | 9/1978 | Clarke et al. |
| 4,184,914 A | | 1/1980 | Jenkins |
| 4,303,562 A | | 12/1981 | Hollis et al. |
| 4,306,999 A | | 12/1981 | Adams et al. |
| 4,320,036 A | | 3/1982 | Gobran et al. |
| 4,476,193 A | | 10/1984 | Seidel et al. |
| 4,537,941 A | * | 8/1985 | Kambanis ............... C08L 97/02 527/403 |
| 4,597,831 A | | 7/1986 | Anderson |
| 4,701,383 A | | 10/1987 | Janiga |
| 4,769,434 A | | 9/1988 | Van der Klashorst |
| 5,010,156 A | | 4/1991 | Cook |
| 5,202,403 A | * | 4/1993 | Doering ............... C09D 161/00 530/502 |
| 5,233,012 A | * | 8/1993 | Kawamura ......... C09B 67/0085 106/725 |
| 5,260,405 A | | 11/1993 | Gardziella et al. |
| 5,866,642 A | | 2/1999 | McVay |
| 6,103,060 A | | 8/2000 | Munerelle |
| 6,632,912 B2 | | 10/2003 | Sudan |
| 9,464,219 B2 | | 10/2016 | Pietarinen |
| 10,246,619 B2 | | 4/2019 | Pietarinen |
| 10,301,437 B2 | | 5/2019 | Pietarinen et al. |
| 2003/0045665 A1 | | 3/2003 | Sudan |
| 2011/0245381 A1 | * | 10/2011 | Winterowd ............. C08L 97/02 524/14 |
| 2013/0066012 A1 | | 3/2013 | Winterowd |
| 2013/0131326 A1 | | 5/2013 | Hannus |
| 2014/0030540 A1 | | 1/2014 | Valkonen |
| 2014/0249271 A1 | | 9/2014 | Pietarinen et al. |
| 2015/0159061 A1 | | 6/2015 | Kouisni et al. |
| 2016/0237194 A1 | | 8/2016 | Pietarinen et al. |
| 2016/0257791 A1 | | 9/2016 | Pietarinen et al. |
| 2016/0369141 A1 | | 12/2016 | Pietarinen |
| 2019/0177585 A1 | | 6/2019 | Pietarinen |
| 2021/0238424 A1 | | 8/2021 | Nasli Bakir et al. |
| 2021/0238464 A1 | | 8/2021 | Nasli Bakir et al. |
| 2022/0089805 A1 | | 3/2022 | Adriano Saraiva et al. |
| 2023/0056241 A1 | | 2/2023 | Nejad et al. |

FOREIGN PATENT DOCUMENTS

| | | |
|---|---|---|
| CA | 1150441 A | 7/1983 |
| CA | 2108176 A1 | 10/1992 |
| CA | 2158636 A1 | 11/1992 |
| CA | 2133740 A1 | 10/1993 |
| CA | 2137778 A1 | 1/1994 |
| CA | 2159711 A1 | 10/1994 |
| CA | 1062827 A | 9/1997 |
| CA | 1068426 A | 12/1997 |
| CA | 2277285 A1 | 7/1998 |
| CA | 2277286 A1 | 7/1998 |
| CA | 2335253 A1 | 12/1998 |
| CA | 2081495 A1 | 6/1999 |
| CA | 2042476 C | 8/1999 |
| CA | 2439362 A1 | 9/2002 |
| CA | 2355808 A1 | 2/2003 |
| CA | 2399171 A1 | 2/2003 |
| CA | 2458159 A1 | 7/2005 |
| CA | 2526420 A1 | 12/2005 |
| CA | 2824446 A1 | 8/2011 |
| CA | 2832108 A1 | 10/2012 |
| CA | 2848056 A1 | 3/2013 |
| CA | 2856145 A1 | 10/2013 |
| CA | 2867744 A1 | 10/2013 |
| CA | 2867912 A1 | 10/2013 |
| CA | 2872333 A1 | 12/2013 |
| CA | 2924977 A1 | 4/2015 |
| CA | 2925661 A1 | 4/2015 |
| CA | 2926315 A1 | 6/2015 |
| CA | 2927313 A1 | 6/2015 |
| CA | 2933438 A1 | 6/2015 |
| CA | 2930962 A1 | 8/2015 |
| CL | 199802049 | 1/1998 |
| CL | 200701503 | 8/2007 |
| CN | 101260283 A | 9/2008 |
| CN | 104087219 A | 10/2014 |
| CN | 104245799 A | 12/2014 |
| DE | 4030718 A | 4/1992 |
| EP | 2993201 A1 | 3/2016 |
| JP | 2003-159703 A | 6/2003 |
| JP | 2004-210816 A | 7/2004 |
| JP | 2005-060590 A | 3/2005 |
| JP | 2014-133817 A | 7/2014 |
| WO | 1993-021260 A1 | 10/1993 |
| WO | 2006031175 A1 | 3/2006 |
| WO | WO 2012/005677 A1 | 1/2012 |
| WO | 2012-106808 A1 | 8/2012 |
| WO | 2012136894 A1 | 10/2012 |
| WO | WO 2012/136984 | 10/2012 |
| WO | 2013-144454 A1 | 10/2013 |
| WO | 2015044528 A1 | 4/2015 |
| WO | 2015079107 A1 | 6/2015 |

OTHER PUBLICATIONS

Calculation 17693140 (Year: 2024).*
E.I. Evstigneev, "Factors Affecting Lignin Solubility", Macromolecular Chemistry and Polymeric Materials, Russian Journal of Applied Chemistry, 2011, vol. 84, No. 6, pp. 1040-1045.
Notice of Opposition from Application No. 15191860.4 dated Feb. 8, 2018.
Terry Sellers, Jr., et al., "Lignin-modified phenol-formaldehyde resin development for fiberboard", Forest Products Journal, vol. 54, No. 9.
Opposition Against European Patent No. 2 993 201 B1 dated Feb. 2, 2018.
Richard W. Hemingway, et al., "Adhesives from Renewable Sources", ACS Symposium Series 385, American Chemical Society.
Lin-wu Zhao, et al., "Utilization of Softwood Kraft Lignin as Adhesive for the Manufacture of Reconstituted Wood", Journal of Wood Chemistry and Technology, 14:1, 127-145.
International Search Report for corresponding International Patent Application No. PCT/FI2013/050353 mailed Jul. 8, 2013.
International Preliminary Report on Patentability for corresponding International Patent Application No. PCT/2013/050353 mailed Mar. 5, 2014.
Finnish Search Report for corresponding Finnish Application No. 20125358 mailed Feb. 14, 2013.
Opposition filed against Finnish Patent 123936 (Application No. 20125358) on Oct. 16, 2014.
Chinese Office Action for Chinese Patent Application No. 201380017606.X mailed Sep. 25, 2015 with English translation, 39 pages.

(56) References Cited

OTHER PUBLICATIONS

Hu, L. et al., "Methods to Improve Lignin's Reactivity as a Phenol Substitute and as Replacement for other Phenolic Compounds: A Brief Review," *BioResources*, 6(3): 3515-3525 (2011).
Jimenez, M. et al., "Increase of Lignin Reactivity by Means of Depolymerization and Hydroxymethylation for its Use in Synthetic Wood Elaboration," *Journal of Chemistry & Chemical Engineering*, 6(2): 124-137 (2012).
Ouyang, X. et al., "Preparation of Lignin-Modified Phenol-Formaldehyde Resin Adhesive," *Human Ligong Daxue Xuebao, Ziran Kexueban*, 39(11):22-26 (2011), abstract.
Park, Y. et al., "Developing lignin-based resin coatings and composites," *Industrical Crops and Products*, 27:163-167 (2008).
Sellers, Jr., T. et al., "Lignin-modified phenol-formaldehyde resin development for fiberboard," *Forest Products Journal*, 54(9): 45-51, (2004).
Zhao, L. et al., "Utilization of Softwood Kraft Lignin as Adhesive for the Manufacture of Reconstitute Wood," *Journal of Wood Chemistry and Technology*, 14(1): 127-137 (1994).
Zhu, W. et al., "Equilibrium of Lignin Precipitation," *Proceedings of the 16th ISWFPC*, Tianjin, P.R. China, 5 pages, Jun. 8-10, 2011.
Chen, "Gluability of kraft lignin copolymer resins on bonding southern pine plywood," Holzforschung-International Journal of the Biology, Chemistry, Physics and Technology of Wood, 49(2): 153-57 (1995).
El Mansouri et al., "Lignin-based polycondensation resins for wood adhesives," Journal of Applied Polymer Science, 103:1690-9 (2007).
Goncalves et al., "Hydroxymethylation and oxidation of Organosolv lignins and utilization of the products," Bioresour Technol, 79(2): 103-11 (2001).
Gothwal et al., "Synthesis of low cost adhesives from pulp & paper industry waste," Journal of Scientific and Industrial Research, 69:390-5 (2010).
Birgitta Danielson et al., "Kraft lignin in phenol formaldehyde resin, part 1, Partial replacement of phenol by Kraft lignin in phenol formaldehyde adhesives for plywood," Journal of Adhesion Science and Technology, 12(9): 923-939 (1998).
Sukhbaatar et al. "Use of lignin separated from bio-oil in oriented strand board binder phenol-formaldehyde resins." BioResources 4.2 (2009).
Mansouri et al. "Lignin-based polycondensation resins for wood adhesives." Journal of Applied Polymer Science 103.3 (2007): 1690-1699.
Çetin et al. "Studies on lignin-based adhesives for particleboard panels." Turkish Journal of Agriculture and Forestry 27.3 (2003): 183-189.
Arunjunaj Raj Mahendran et al., "Thermal Characterization of Kraft Lignin Phenol-Formaldehyde Resin for Paper Impregnation," Journal of Adhesion Science and Technology 24 (2010) 1553-1565 (pp. 13).
Arunjunaj Raj Mahendran et al., "Thermal Characterization of Kraft Lignin Phenol-Formaldehyde Resin for Paper Impregnation," Wood Adhesives, pp. 291-303 (2010) (pp. 14).
Examination Search Report for Canadian Application No. 2926315 mailed Jun. 8, 2017 (3 pages).
Chinese Office Action from Chinese Application No. 201480064468.5 dated Feb. 23, 2017 (34 pages).
Notice of Reasons for Rejection in Japanese Application No. 2016-53420 mailed Oct. 2, 2018 (4 pages).
Granata et al., "2-Chloro-4,4,5,5,-tertramethyl-1,3,2-dioxaphospholane, a reagent for the accurate determination of the uncondensed and condensed phenolic moieties in lignins," J. Agric. Food Chem, 1995, 43: 1538-1544 (1995) (7 pages).
M. N. Mohamad Ibrahim, et al., "Formulation of Lignin Phenol Formaldehyde Resins as a Wood Adhesive," The Malaysian Journal of Analytical Sciences, vol. 11, No. 1 (2007) 213-218 (6 pages).
Malterud et al., "C-Methylated Dihydropchalcones from Myrica gale L: Effects as Antioxidants and as Scavengers of 1,1-Diphenyl-2-Picrylhydrazyl," Pharmacol. Toxicol., 78: 111-116 (1996) (6 pages).
Yanyan Chen, "Preparation of Phenol-Lignin by Phenolating Enzymolyzed Lignin and Property Study," a dissertation for master degree of South China Technical University, published on Dec. 15, 2011 (13 pages).
Arthur L. Fricke, "Physical Properties of Kraft Black Liquor," Energy Conservation, Technical Center Office of Science and Technology Information, Unites States Department of Energy, Dec. 1983 (174 pages).

\* cited by examiner

METHOD FOR PRODUCING A BINDER COMPOSITION, BINDER COMPOSITION, AND WOOD PRODUCT

This application is a Divisional of U.S. patent application Ser. No. 16/274,429, filed Feb. 13, 2019, which is a Divisional of U.S. patent application Ser. No. 15/251,509, filed Aug. 30, 2016, now U.S. Pat. No. 10,246,619, issued Apr. 2, 2019, which is a Divisional of U.S. patent application Ser. No. 14/351,701, filed Apr. 14, 2014, now U.S. Pat. No. 9,464,219, issued Oct. 11, 2016, which is a National Stage Application of PCT/FI2013/050353, filed Mar. 28, 2013, which claims benefit of Ser. No. 20/125,358, filed Mar. 29, 2012 in Finland, all of which applications are incorporated herein by reference in their entireties.

FIELD OF THE INVENTION

The invention relates to a method for increasing the reactivity of lignin and to the further use of such lignin.

BACKGROUND OF THE INVENTION

Lignin is a natural polymer, which can be extracted from e.g. wood. As lignin is a natural biopolymer its use as a component in glues instead of synthetic materials has been investigated in order to come up with a more environmentally friendly adhesive composition. Especially, the ability to replace synthetic phenol in phenolic resins, such as phenol formaldehyde resin, has been the object of prior art.

Different types of adhesive compositions, such a phenolic glues, can be used with wood products. Examples of such glues include compositions comprising phenol formaldehyde resin. Traditionally synthetic phenol formaldehyde resins are produced by polymerizing phenol and formaldehyde in the presence of a catalyst. Examples of such catalysts are sodium hydroxide (NaOH) and acids. The method for producing phenol formaldehyde resin comprises adding formaldehyde in a stepwise manner to a phenol composition and thereafter rising the temperature of the formed composition up to 80-90° C. The composition is cooked at this temperature until a desired viscosity of the formed resin or polymer chain length is reached.

Lignin can be used for the purpose of decreasing the amount of synthetic phenol in a resin composition. Lignin has previously been used for replacing phenol during the production of lignin-phenol-formaldehyde resin.

It has been possible to replace up to 30 of the synthetic phenol in the final resin, e.g. phenol formaldehyde resin, with lignin, but higher replacement results in unsatisfying properties of the produced glue.

The inventors have therefore recognized a need for a method, which would result in a higher phenol replacement in the composition and thus in a more environmentally friendly binder composition having suitable properties for use in different applications.

PURPOSE OF THE INVENTION

The purpose of the invention is to provide a new method for increasing the reactivity of lignin. Further, the purpose of the invention is to provide a new type of method, where the more reactive lignin is used for replacing at least part of the amount of synthetic materials used during the production of a binder composition. Especially the purpose is to produce a more environmentally friendly binder composition to be used e.g. in adhesive applications.

SUMMARY

According to one embodiment, a binder composition formed from an aqueous composition is disclosed. The aqueous composition comprises lignin, a catalyst, a polymerizable substance, a crosslinking agent and water. The crosslinking agent and the catalyst constitute 18 to 70 wt % of dry content in the aqueous composition. The polymerizable substance and the lignin constitute 55 to 74 wt % of the dry content in the aqueous composition. The crosslinking agent is formaldehyde. The polymerizable substance is phenol. The catalyst is sodium hydroxide.

According to another embodiment, a wood product is disclosed. The wood product includes a composite structure formed of two or more layers. The two or more layers are arranged one above another. The wood product further includes a binder composition binding together adjacent layers of the two or more layers. The binder composition is formed from an aqueous composition. The aqueous composition comprises lignin, a catalyst, a polymerizable substance, a crosslinking agent, and water. The crosslinking agent and the catalyst constitute 18 to 70 wt % of dry content in the aqueous composition. The polymerizable substance and the lignin constitute 55 to 74 wt % of the dry content in the aqueous composition. The crosslinking agent is formaldehyde. The polymerizable substance is phenol. The catalyst is sodium hydroxide.

BRIEF DESCRIPTION OF THE DRAWINGS

The accompanying drawings, which are included to provide a further understanding of the invention and constitute a part of this specification, illustrate some embodiments of the invention and together with the description helps to explain the principles of the invention. In the drawings.

DETAILED DESCRIPTION OF THE INVENTION

Figure 1:
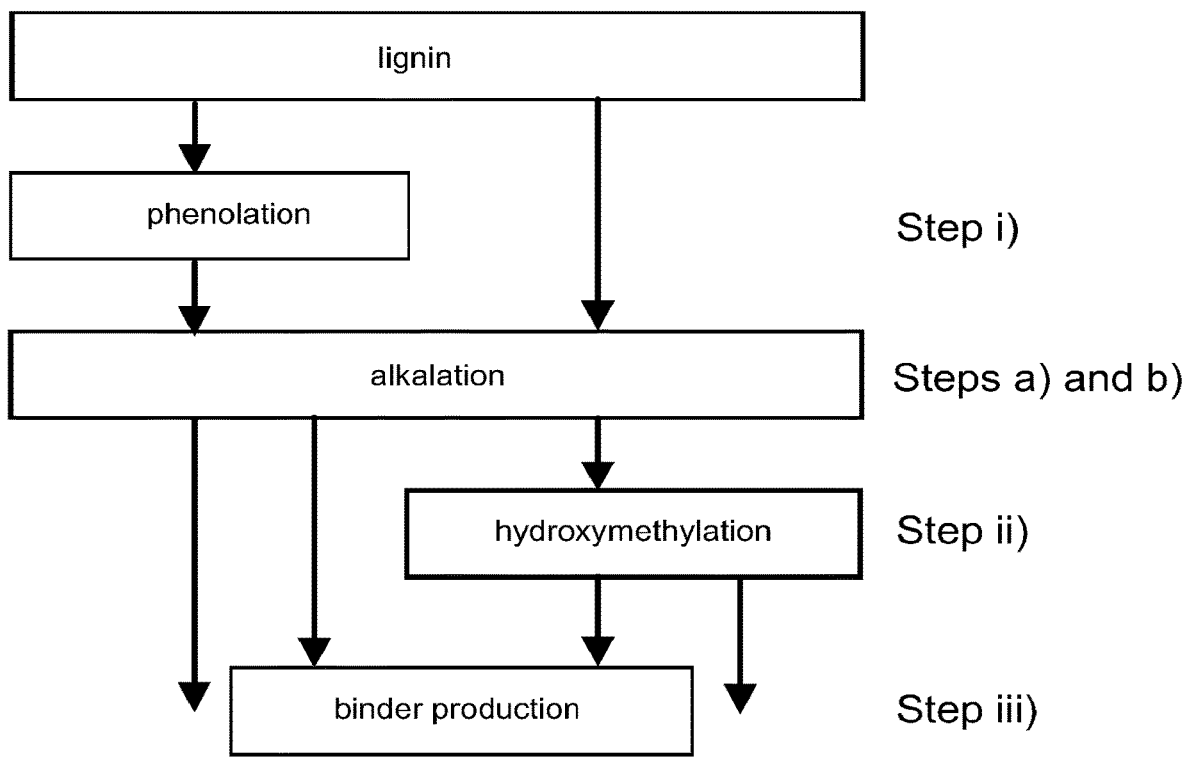
FIG. 1 is a flow chart illustration of a method for increasing the reactivity of lignin and of the use of lignin having increased reactivity according to one embodiment of the present invention.

The present invention relates to a method for increasing the reactivity of lignin, which method comprises the following steps:

a) forming, under heating at a temperature of 30-70° C., an aqueous dispersion comprising alkali and lignin, wherein the alkali comprises an hydroxide of an alkali metal; and b) heating the dispersion formed in step a) at a temperature of 50-95° C. for producing alkalated lignin.

A drawback of different methods for separating or isolating lignin from e.g. biomass is that the lignin is condensed during the procedure due to the low pH environment used. Thus, separated lignin has a rather low reactivity and a heterogenic nature, which affect the reactions with other reactant components during e.g. the production of a binder composition. The low reactivity of lignin has been one of the reasons preventing a higher replacement level of e.g. synthetic phenol in binder compositions with biobased lignin. It has been recognized that the properties of currently available binder compositions, wherein up to 50-60% of the synthetic phenol has been replaced with lignin, are not acceptable for e.g. gluing applications. E.g. the strength of glued joints has not been on a required level.

The inventors surprisingly found out that the reactivity of lignin can be increased by the method of the present invention and further that a higher replacement level of e.g. synthetic phenol in binder compositions can be achieved when using this kind of activated lignin during the production of the binder composition.

The expression "lignin having increased reactivity" should be understood in this specification, unless otherwise stated, as referring to lignin, which has been treated by the method according to the present invention. Treating the lignin with the method according to the present invention activates the lignin making it more suitable for use in further applications. The reactivity of lignin is thus increased compared to lignin, which has not been treated by the method according to the present invention.

In this specification, unless otherwise stated, the expression "lignin" should be understood as any lignin suitable to be used in the present invention.

Lignin may include essentially pure lignin as well as lignin derivatives and lignin modifications.

By the expression "essentially pure lignin" should be understood as at least 90% pure lignin, preferably at least 95% pure lignin. In one embodiment of the present invention the essentially pure lignin comprises at most 10%, preferably at most 5%, of other components. Extractives and carbohydrates such as hemicelluloses can be mentioned as examples of such other components.

In one embodiment of the present invention the lignin to be treated by the method according to the present invention is selected from a group consisting of kraft lignin, biomass originating lignin, lignin from alkaline pulping process, lignin from soda process, lignin from organosolv pulping and combinations thereof.

Different lignin components may have different properties, e.g. molecular weight, molar mass, polydispersity, hemicellulose and extractive contents. In one embodiment of the present invention the lignin includes water but no solvent.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different, techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value. Thus the properties of the lignin can be varied depending on the end use of the gluing application.

The precipitated lignin can be purified from inorganic impurities, hemicellulose and wood extractives using acidic washing steps. Further purification can be achieved by filtration.

In one embodiment of the present invention the dry matter content of the lignin is below 98%, preferably 40-80%, and more preferably 50-70%.

In one embodiment of the present invention the lignin is separated from pure biomass. The separation process can begin with liquidizing the biomass with strong alkali followed by a neutralization process. After the alkali treatment the lignin can be precipitated in a similar manner as presented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further processing.

The alkali comprises a hydroxide of an alkali metal. In one embodiment of the present invention the alkali is selected from a group consisting of sodium hydroxide, potassium hydroxide and mixtures thereof. In one embodiment of the present invention the alkali is sodium hydroxide.

In one embodiment of the present invention the concentration of alkali is 5-50 weight-%, and preferably 10-25 weight-% based on the total weight of the dispersion in step a).

In one embodiment of the present invention the concentration of lignin in step a) is 10-50 weight-%, preferably 20-50 weight-%, and more preferably 20-45 weight-% based on the total weight of the dispersion in step a).

In one embodiment of the present invention the temperature in step a) is preferable 50-65° C.

In one embodiment of the present invention the temperature in step b) is preferable 60-75° C.

In one embodiment of the present invention step b) is carried out for 15 minutes-24 hours, preferably for no longer than 5 hours, and more preferably for 0.5-1.5 hours.

The method according to the present invention, and especially the alkalation steps a) and b) result in the lignin being activated. As above discussed, lignin is condensed during acidic isolation or separation processes. Without limiting the invention to any specific theory about why alkalation of lignin results in a more reactive lignin being formed, it is to be considered that the alkalation opens the macromolecular structure of lignin whereby the steric hindrances that usually disable reactive groups in lignin structures are removed. Alkalation may also add charged groups to the lignin macromolecule. The advantage of using alkalated lignin e.g. for producing a binder composition is that the compatibility and reaction behavior is much better than in a normal case, where non-treated lignin has been used in the cooking or polymerizing stage.

In one embodiment of the present invention the method comprises, before step a), the step i) of reacting lignin with a compound selected from the class of phenols. In one embodiment of the present invention the compound is selected from a group consisting of phenol, cresol, resorcinol and combinations thereof. In one embodiment of the present invention the compound is phenol. Allowing the aliphatic part of lignin to react with e.g. phenol increases the number of phenolic OH-groups attached to the aliphatic part of lignin. As the number of OH-groups increases the reactivity of lignin during e.g. the cooking step of a binder production method with the other reactant components is increased. The advantage of alkalating phenotated lignin is that in addition of having new phenolic OH-groups attached to the lignin the lignin structure will be opened as above discussed. The increased reactivity of lignin has the advantage of enabling to replace a higher amount of synthetic reactants such as phenol with biobased lignin in the final binder composition.

In one embodiment of the present invention step i) is carried out at a temperature of 100-140° C. for 1-3 hours in the presence of a catalyst. In one embodiment of the present invention the catalyst used in step i) is an acid, preferably sulphuric acid ($H_2SO_4$).

In one embodiment of the present invention the method comprises, after step b), the step ii) of adding an aldehyde, a derivative of an aldehyde, or a combination thereof to the dispersion formed in step b). In one embodiment of the present invention the derivative of an aldehyde is, paraformaldehyde or. In one embodiment of the present invention alkalated lignin is reacted with an aromatic aldehyde, or glyoxal. In one embodiment of the present invention the aromatic aldehyde is furfuryl aldehyde. In one embodiment of the present invention the aldehyde is formaldehyde.

In one embodiment of the present invention the alkalated lignin is reacted with an aldehyde, e.g. formaldehyde, in order to form hydroxymethylated lignin. Allowing alkalated lignin to react with e.g. formaldehyde further increases the reactivity of lignin as hydroxymethyl groups are increased, which groups easily react with the other reactant components during e.g. the resin cooking step.

In one embodiment of the present invention, in step ii), the weight ratio of the aldehyde to lignin in the dispersion from step b) is 0.2-0.7, and preferably 0.3-0.6.

The present invention further relates to lignin obtainable by the method of the present invention. In one embodiment of the present invention the lignin obtainable by the method of the present invention can be lignin, which has been subjected to alkalation; to phenolation and alkalation; to alkalation and hydroxymethylation; or to phenolation, alkalation and hydroxymethylation.

The present invention further relates to a method for producing a binder composition, wherein the method comprises the step of:

(iii) cooking an aqueous composition comprising reactant components including lignin treated according to the present invention, a polymerizable substance and a crosslinking agent in the presence of a catalyst at a temperature of 60-95° C. for polymerizing the reactant components until a binder composition with a predetermined viscosity value is formed.

In one embodiment of the present invention the lignin used in the method for producing a binder composition is lignin, which has been alkalated according to the present invention. In one embodiment of the present invention the lignin used in the method for producing a binder composition is lignin, which has been phenolated and alkalated according to the present invention. In one embodiment of the present invention the lignin used in the method for producing a binder composition is lignin, which has been alkalated and hydroxymethylated according to the present invention. In one embodiment of the present invention the lignin used in the method for producing a binder composition is lignin, which has been phenolated, alkalated and hydroxymethylated according to the present invention.

In one embodiment of the present invention the predetermined viscosity value of the final binder composition is at least 40 cP, preferably at least 50 cP, and more preferably at least 80 cP. In one embodiment of the present invention the predetermined viscosity value of the final binder composition is at least 40 but not more than 250 cP, preferably at least 50 cP but not more than 150 cP, and more preferably at least 80 but not more than 120 cP.

In one embodiment of the present invention the predetermined viscosity value of the final binder composition is at least 250 cP, preferably at least 300 cP, and more preferably at least 500 cP. In one embodiment of the present invention the predetermined viscosity value of the final binder composition is at least 250 cP but not more than 1500 cP, preferably at least 300 cP but not more than 1200 cP, and more preferably at least 500 but not more than 1000 cP. The viscosity is measured at 25° C. using a rotary viscometer. The predetermined viscosity value of the final binder composition may vary depending on the specific application where the binder composition is to be used.

The precise order of combining and/or adding the components needed for the binder composition production may vary depending e.g. on the required properties of the formed binder composition. The choice of the sequence of combining and/or adding the required components is within the knowledge of the skilled person. The precise amount of the components used for producing the binder composition may vary and the choice of the amounts of the different components is within the knowledge of the skilled person based on this specification. The temperature can be controlled during the production of the binder composition by cooling and/or heating the composition.

The essential feature of the binder production method is that the reactant components, e.g. lignin treated according to the present invention, the crosslinking agent and the polymerizable substance, are allowed to react with each other in an aqueous environment in the presence of a catalyst and under heating such that the reactant components are truly synthesized together and not just physically mixed together.

The method of the present invention surprisingly results in a more environmentally friendly binder composition since in the binder production method the natural polymer lignin, which is a phenolic polymer, has replaced at least part of the synthetic phenol substance usually used in the production of phenolic compositions such as phenol formaldehyde resin. Without limiting the invention to any specific theory about why the method of the present inventions results in the aforementioned advantage, it is to be considered that the suitability of replacing at least part of e.g. the phenol with lignin is due to the fact that lignin, the reactivity of which has been increased by the method of the present invention, effectively react with an aldehyde, such as formaldehyde, in a quite similar manner as phenol.

In one embodiment of the present invention the aqueous composition further comprises tannin as a reactant component.

In one embodiment of the present invention the tannin used originates from any wood species. Tannin may originate from e.g. bark or heartwood. Quebracho tree, beech tree and wattle tree are presented as examples of possible sources of tannin. In one embodiment of the present invention the tannin used originates from softwood bark. In one embodiment of the present invention the tannin is separated from softwood bark of debarking units in sawmills or pulp mills. The separation process can be combined with an ethanol extraction process, a hot water extraction process, a hot steam extraction process or a water-ethanol extraction process of softwood bark. In one embodiment of the present invention the tannin is condensed tannin. Condensed tannin has a high dry content and is therefore suitable to be used in the present invention. The dry matter content of condensed tannin may vary between 40-100 and is suitably between 60-90% and preferably between 70-80%. Tannin with such dry matter content can easily be dispersed, whereby a good reactivity with the other reactant components is achieved. The tannin may also be hydrolysable tannin.

In one embodiment of the present invention step (iii) comprises cooking the composition preferably at a temperature of 65-90° C., and more preferably at a temperature of 75-85° C.

In one embodiment of the present invention the crosslinking agent is selected from a group consisting of an aldehyde, a derivative of an aldehyde, an aldehyde forming compound and combinations thereof. In one embodiment of the present invention the derivative of an aldehyde is hexamethylenetetramine, paraformaldehyde or trioxane. In one embodiment of the present invention the crosslinking agent is selected from a group consisting of an aromatic aldehyde, glyoxal, furfuryl alcohol, caprolactam and glycol compounds. The aldehyde can be formaldehyde. The aromatic aldehyde can be furfuryl aldehyde. In one embodiment of the present invention the crosslinking agent is a bio-based crosslinking agent. In one embodiment of the present invention the crosslinking agent is an aldehyde, and preferably formaldehyde.

In one embodiment of the present invention the polymerizable substance is selected from a group consisting of phenol, cresol, resorcinol and combinations thereof. In one embodiment of the present invention the polymerizable substance is phenol. In one embodiment of the present invention the polymerizable substance is selected from a group consisting of biobased hydroxyphenols and their derivatives. In one embodiment of the present invention the polymerizable substance is a bio-based polymerizable substance. In one embodiment of the present invention the polymerizable substance is selected from a group consisting of lignin and tannin.

In one embodiment of the present invention the catalyst in step iii) comprises a salt or a hydroxide of an alkali metal. In one embodiment of the present invention the catalyst in step iii) is selected from a group consisting of sodium hydroxide, potassium hydroxide, acids and any mixture thereof. In one embodiment of the present invention the catalyst in step iii) is sodium hydroxide.

In one embodiment of the present invention the relation between the amounts of lignin, catalyst/solvent, polymerizable substance, and crosslinking agent, based on their dry contents, used for producing the binder composition is the following: 18 weight-%, preferably 26-45 weight-%, of crosslinking agent and catalyst/solvent, and 82-30 weight-%, preferably 74-55 weight-%, of the polymerizable substance and lignin.

The present invention further relates to a binder composition obtainable by the method of the present invention.

The present invention further relates to an adhesive composition comprising the binder composition according to the present invention. The adhesive composition can further comprise one or more adhesive components selected from a group consisting of other binders, extenders, additives, catalysts and fillers. A binder is a substance, which is mainly responsible for creating the growing and cross-linking of polymer and thus assists in the curing of polymer systems. An extender is a substance, which assists the binder by adjusting physical properties for example by binding moisture. The additive can be a polymer or an inorganic compound, which assists in properties like filling, softening, reducing costs, adjusting moisture, increasing stiffness and increasing flexibility. The catalyst is a substance, which usually boosts and adjusts the curing speed. By "substance" is herein to be understood as including a compound or a composition. The binder composition of the present invention may serve as a binder, an extender, an additive, a catalyst and/or a filler in the adhesive composition.

The present invention further relates to the use of the binder composition in an impregnation application, as a coating, for strengthening plastic, for producing a compressed casting, a moulding, a laminate or a lacquer, or for gluing a wood product. The binder composition of the present invention can further be used for gluing combinations of plastic and wood.

The present invention further relates to the use of the adhesive composition of the present invention for gluing a wood product.

In one embodiment of the present invention the wood product is selected from a group consisting of a wood board, a wood veneer, and a wood bar.

In one embodiment of the present invention a layered composite structure can be formed of two or more layers including at least one wood veneer layer, wherein the layers are arranged the one above the other and combined by means of gluing with the binder composition according to the present invention and/or the adhesive composition according to the present invention. In this specification, unless otherwise stated, the term "wood veneer" is used to address a veneer, which can be formed of any material, e.g. wood-based material, fiber material, composite material or the like. In this context, the thickness of the wood veneer can be varied. Typically the thickness of wood veneer is below 3 mm.

In one embodiment of the present invention the layered composite structure is selected from a group consisting of a wood panel product, a plywood product, a composite product, and a pressed panel product. The layered composite structure can be formed of a number of layers, preferably wood veneer layers, in which the layers are laid one upon the other and glued together.

The embodiments of the invention described hereinbefore may be used in any combination with each other. Several of the embodiments may be combined together to form a further embodiment of the invention. A method, a composition or a use, to which the invention is related, may comprise at least one of the embodiments of the invention described hereinbefore.

An advantage of the method according to the present invention is that the reactivity of lignin e.g. separated from biomass can be markedly increased and also the heterogenic nature of lignin can be decreased.

An advantage of the present invention is that the reactivity of lignin can be increased by the method, and especially the alkalation step, according to the present invention. Lignin treated with the method according to the present invention has an increased number of reactive groups along the lignin structure compared to non-treated lignin.

An advantage of the method according to the present invention is that by using lignin, the reactivity of which has been increased by the method of the present invention, as a reactant component during the production of a binder composition a more environmentally friendly binder composition is achieved. Surprisingly it has been found out that when using this kind of lignin as a reactant component the amount of the polymerizable substance, such as the synthetic phenol substance, e.g. phenol, can be markedly decreased during the binder production process. As the phenol being a synthetic compound and lignin being a natural polymer, it is advantageous to be able to minimize the amount of phenol present in the final binder composition.

The advantage of reducing the amount of synthetic materials is that a higher level of biobased components is achieved in the final binder composition.

An advantage of the present invention is that by using lignin having increased reactivity compared to non-treated lignin, the properties of the final binder composition are more favorable for gluing applications. Lignin treated with the method according to the present invention enhances curing, adhesion and tensile strength performance of the binder composition. An advantage of the present invention is that the gluing performance of the binder composition or the adhesive composition produced is suitable for using the composition e.g. in exterior applications.

An advantage is that when using lignin, which has higher reactivity than normal, non-treated lignin results in even better compatibility and reaction behavior of the binder production method according to the present invention.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to some embodiments of the present invention for increasing the reactivity of lignin and the further use of the lignin.

FIG. 1 presents different combinations of treatment steps, which can be used for increasing the reactivity of lignin. FIG. 1 illustrates the phenolation step i), the alkalation steps a) and b) and the hydroxymethylation step ii) and their combinations for treating lignin. Lignin having increased reactivity compared to non-treated lignin can be further used in synthesizing a binder composition, step iii) of FIG. 1, or it can be used for any other suitable application as illustrated in FIG. 1.

Before any of the treatment steps the source of lignin is chosen. As presented above, lignin can be selected from kraft lignin, biomass originating lignin, lignin from alkaline pulping process, lignin from soda process, lignin from organosols pulping, and combinations thereof. Also the other components and their amounts to be used in the method according to the present invention are selected. If needed, the components used in the method of FIG. 1 can be pretreated to be suitable for the lignin treatment processes.

Following the various preparations and pretreatments, in one of the embodiments of the present invention shown in FIG. 1, step i) is carried out. Step i) comprises reacting lignin with a compound selected from the class of phenols in the presence of a catalyst. As a result of step i) of phenolation, reactive phenolic OH-groups are attached to the aliphatic portion of lignin.

After step i), step a) is to be carried out. Alternatively, the lignin can be directly treated according to step a) without firstly being treated in accordance with step i) as is illustrated in FIG. 1.

Step a) comprises forming an aqueous dispersion comprising alkali and lignin under heating. The alkali comprises a hydroxide of an alkali metal. Then step b) is carried out by heating the formed dispersion at a temperature of 50-95° C. Step a) and step b) result in the lignin being activated through alkalation.

After step b) the alkalated lignin fraction can be introduced into the cooking step of the binder composition production method, during which said lignin is polymerized with the other reactant components used in the binder composition production method (step iii) of FIG. 1).

Alternatively the alkalated lignin from step b) can be further reacted with an aldehyde in step ii) before being introduced into the synthesis of binder composition. Step ii) is carried out by adding e.g. formaldehyde into the dispersion of alkalated lignin from step b), which results in a hydroxymethylated product being formed.

As a result of step iii) a binder composition having desired properties and especially being for most parts based on biobased components is produced. This binder composition can be used as such for gluing applications or it can be further processed with other adhesive components for producing an adhesive composition.

As above presented, in addition to using the alkalated lignin from step b) or hydroxymethylated lignin from step ii) in a method for producing a binder composition, the alkalated lignin or hydroxymetylated lignin can be used as such in any other suitable application.

Example 1—Alkalation

In this example the reactivity of lignin was increased by alkalating the lignin. The following components and their amounts were used:

|  | concentration | amount (g) |
| --- | --- | --- |
| water |  | 836 |
| NaOH | 50% | 584 |
| lignin | 75% | 1270 |

Firstly, water and NaOH were mixed and heating of the mixture was started. Then lignin was dispersed slowly into the mixture of alkali and water with agitation and simultaneously the temperature was increased up to 60° C. When all of the lignin had been dispersed, the dispersion was heated at a temperature of about 75° C. for 1.5 hours. As a result the lignin became alkalated.

Lignin treated in accordance with Example 1 was thereafter used for producing a binder composition. 38 g of phenol (90%) were mixed with 105 g of alkalated lignin, after which 79 g of formaldehyde (37%) was added in a stepwise manner. NaOH was used as catalyst. The temperature was kept under 75° C. Thereafter the cooking was continued at 85-90° C. until the viscosity of the formed composition was about 415 cp (as measured at a temperature of 25° C.).

Figure 2:
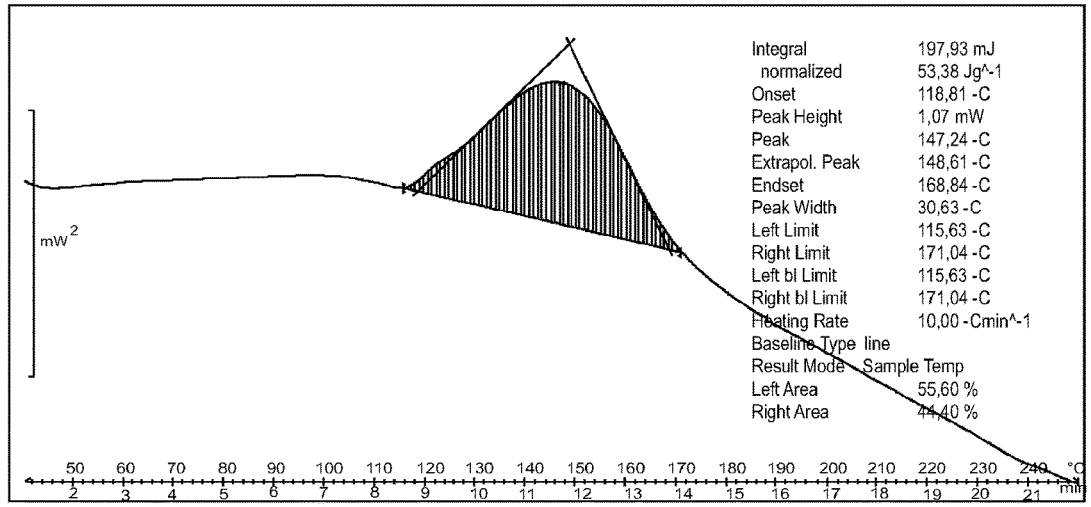
FIG. 2 shows the result of differential scanning calorimetry (DSC) measurement of a binder composition (resin) produced by using lignin alkalated in accordance with the present invention.

The formed binder composition or resin was thereafter subjected to DSC measurements, the results of which can be seen in FIG. 2.

A comparative example 1 was formed by using lignin that had been treated in the following manner:

The following components and their amounts were used:

|  | concentration | amount (g) |
| --- | --- | --- |
| water |  | 836 |
| NaOH | 50% | 584 |
| lignin | 75% | 1270 |

Firstly, water and NaOH were mixed and heating of the mixture was started. Then lignin was added into the mixture of alkali and water with agitation and simultaneously the temperature was increased up to 95° C. When the lignin had been added, the mixture was heated at a temperature of about 90° C. for 1 hour.

Lignin from comparative example 1 was used for producing a comparative binder composition 1 in a similar manner as above described. The formed comparative binder composition was also subjected to DSC measurements.

Figure 3:
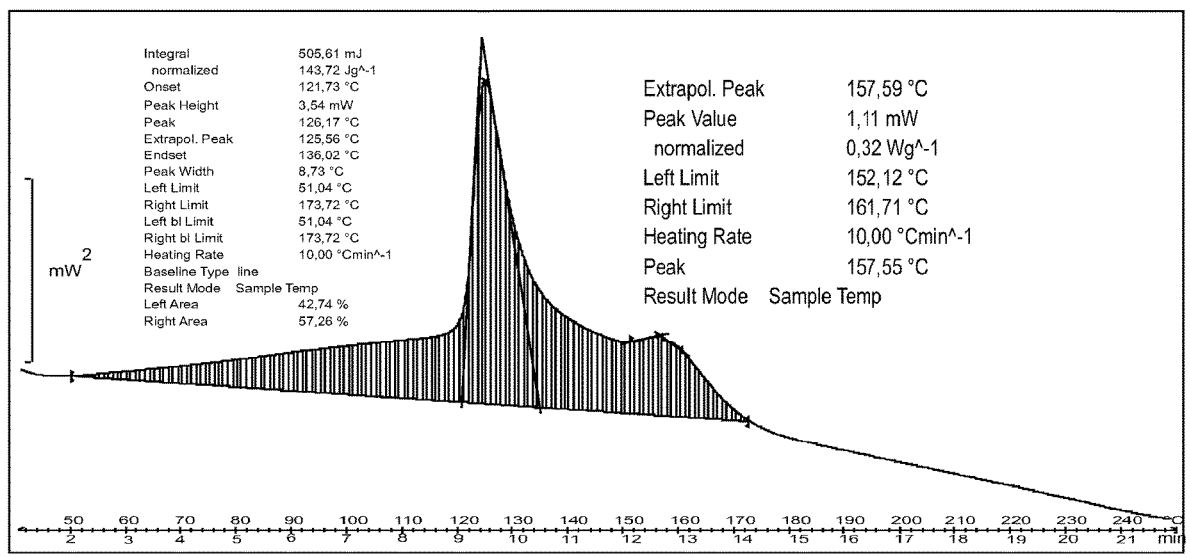
FIG. 3 shows the result of DSC measurement of a binder composition (resin) produced by using lignin treated in accordance with comparative example 1.

The results from the DSC measurements of comparative binder composition 1 are presented in FIG. 3.

As can be seen from FIG. 2, the binder composition formed by using lignin alkalated according to the present invention shows only one distinct peak. On the contrary, as can be seen from FIG. 3, the comparative binder composition showed several peaks.

The distinct peak of FIG. 2 indicates that alkalated lignin has reacted with phenol and formaldehyde forming a homogenous and uniform polymer structure. The several distinct peaks in FIG. 3 indicate that phenol and formaldehyde react without a reaction with alkalated lignin or only partly together with alkalated lignin.

Without limiting the invention to any specific theory about why alkalation of lignin in accordance with the present invention results in this advantageous result, it is to be considered that lignin alkalated in accordance with comparative example 1 remains in its original particle form or is agglomerated into larger clusters whereby the alkalation process is able to affect only the surface of such clusters or particles. Alkalation of lignin in accordance with the present invention results in lignin being well dispersed or dissolved when the alkalation process begins. As greater part or area of the lignin being alkalated, the reactivity of lignin is increased compared to lignin alkalated in accordance with the process of the comparative example. As lignin has an increased reactivity, it will easily react with the other reactant components during the binder composition production.

Example 2—Alkalation, Low Temperature

In this example the reactivity of lignin was increased by alkalating the lignin. The following components and their amounts were used:

|       | concentration | amount (g) |
|-------|---------------|------------|
| water |               | 836        |
| NaOH  | 50%           | 584        |
| lignin| 75%           | 1270       |

Firstly, water and NaOH were mixed and heating of the mixture was started. Then lignin was dispersed slowly into the mixture of alkali and water with agitation and simultaneously the temperature was increased up to 60° C. When all of the lignin had been dispersed, the dispersion was heated at a temperature of about 60° C. for about 1 hour. As a result the lignin became alkalated.

Example 3—Alkalation, High Temperature

In this example the reactivity of lignin was increased by alkalating the lignin. The following components and their amounts were used:

|       | concentration | amount (g) |
|-------|---------------|------------|
| water |               | 836        |
| NaOH  | 50%           | 584        |
| lignin| 75%           | 1270       |

Firstly, water and NaOH were mixed and heating of the mixture was started. Then lignin was dispersed slowly into the mixture of alkali and water with agitation and simultaneously the temperature was increased up to 60-70° C. When all of the lignin had been dispersed, the dispersion was heated at a temperature of about 90-95° C. for about 1 hour. As a result the lignin became alkalated.

Example 4—Phenolation in Combination With Alkalation and Use of Treated Lignin for Producing a Binder Composition In this example the reactivity of lignin was increased by phenolating and alkalating the lignin, where after the treated lignin was used for producing a binder composition.

Firstly the phenolation was performed. The following components and their amounts were used:

|         | concentration | amount (g) |
|---------|---------------|------------|
| water   |               | 364        |
| phenol  | 90%           | 381        |
| lignin  | 98%           | 446        |
| $H_2SO_4$ | 96%         | 9          |

Water, phenol and lignin were mixed under agitation for about 5-10 minutes after which $H_2SO_4$ was added. Then, the temperature was slowly increased up to 135° C. during a period of about 3 hour and kept at that temperature for about one hour. Then the mixture was cooled and the treatment ended resulting in phenolated lignin.

Then the phenolated lignin was alkalated. 430 g of phenolated lignin was mixed with 150 g 50.0% NaOH under heating. Then the dispersion was heated at a temperature of 75° C. for about 1 hour.

As a result of the above treatments, phenolated and alkalated lignin was formed.

After the phenolation and alkalation treatments, 38 g of water and 38 g of phenol (90%) were added to the composition, after which 368 g of formaldehyde (39.3%) was added in a stepwise manner. The temperature was kept under 75° C. Thereafter the cooking was continued at 85-90° C. until the viscosity of the formed composition was about 415 cp (as measured at a temperature of 25° C.).

Example 5—Alkalation in Combination With Hydroxymethylation and Use of Treated Lignin for Producing a Binder Composition In this example the reactivity of lignin was increased by alkalating and hydroxymethylating the lignin, where after the treated lignin was used for producing a binder composition. The following components and their amounts were used:

| water                          | 220 g |
|--------------------------------|-------|
| NaOH (first part, alkalation) 50% | 146 g |

-continued

| | |
|---|---|
| lignin 61% | 752 g |
| formaldehyde (first part, hydroxymethylation) 39.30% | 514 g |
| phenol 90% | 510 g |
| formaldehyde (second part, binder formation) 39.30% | 566 g |
| NaOH (second part, binder formation) 50% | 146 g |
| NaOH (third part, binder formation) 50% | 146 g |

Firstly, water and NaOH were mixed and heating of the mixture was started. Then lignin was dispersed slowly into the mixture of alkali and water with agitation and simultaneously the temperature was increased up to about 75° C. When all of the lignin had been dispersed, the dispersion was heated at about 75° C. for about 1 hour. As a result the lignin became alkalated. Then formaldehyde was added to the dispersion and the reaction was allowed to continue for about 1 hour resulting in the lignin being hydroxymetylated.

The treated lignin was used for producing a binder composition. The phenol was added to the composition, followed by the addition of formaldehyde and then NaOH. Cooking of the formed composition was continued, with addition of NaOH, at a temperature of 70-90° C. until the viscosity of the formed composition was about 300 cp (as measured at a temperature of 25° C.).

Example 7—Preparing an Adhesive Composition

In this example the binder composition produced in Example 4 was used for the production of an adhesive composition. The binder composition was mixed with extenders, fillers, catalysts, additives, as examples of which e.g. starch, wood flour and hardener (e.g. tannin or carbonates) can be mentioned, thus forming the adhesive composition.

Example 8—Applying the Binder Composition for Producing a Plywood Product

Wood veneers having the thickness of below 3 mm were glued together with the binder composition produced in Example 5 for producing a 7-plywood. Results showed that the gluing effect was sufficiently good for gluing wood veneers.

Example 9—Applying the Adhesive Composition for Producing a Plywood Product

In this example the adhesive composition of Example 7 was applied onto wood veneers. The wood veneers were joined together by the adhesive composition for forming a plywood. The dry matter content of the adhesive composition was between 45 and 55°. The wood veneers with the adhesive composition were pressed by hot-pressing technique at a temperature between 120-170° C. The adhesive composition was simultaneously cured. The adhesive composition of the present invention was found suitable for gluing wood veneers together and thus for manufacturing plywood.

Example 10—Applying the Binder Composition for Producing Laminates

In this example the binder composition as produced in Example 4 was used in an impregnation application. During the production of laminates paper was impregnated with an alcohol solution of the binder composition, after which the impregnated layers were transferred into a furnace. The alcohol was volatilized and the binder composition was partly cured. The layers comprising such semi-cured composition were arranged the one above the other and baked by a hot-pressing technique in order to form uniform thicker boards or laminates.

In the binder production method presented in the examples above, phenol and formaldehyde are used. However, any other polymerizable substance or crosslinking agent can be equally well used in the binder composition production method as will be obvious for the skilled person based on this specification.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A binder composition formed from an aqueous composition, the aqueous composition comprising:
    lignin;
    a catalyst;
    a polymerizable substance;
    a crosslinking agent; and
    water,
    wherein the crosslinking agent and the catalyst constitute 18 to 70 wt % of dry content in the aqueous composition,
    the polymerizable substance and the lignin constitute 55 to 74 wt % of the dry content in the aqueous composition,
    the crosslinking agent is formaldehyde,
    the polymerizable substance is phenol, and
    the catalyst is sodium hydroxide.

2. The binder composition of claim 1, wherein the crosslinking agent and the catalyst constitute 26 to 45 wt % of the dry content in the aqueous composition.

3. A wood product comprising:
    a composite structure formed of two or more layers, the two or more layers being arranged one above another; and
    a binder composition binding together adjacent layers of the two or more layers, the binder composition formed from an aqueous composition, the aqueous composition comprising:
    lignin;
    a catalyst;
    a polymerizable substance;
    a crosslinking agent; and
    water,
    wherein the crosslinking agent and the catalyst constitute 18 to 70 wt % of dry content in the aqueous composition,
    the polymerizable substance and the lignin constitute 55 to 74 wt % of the dry content in the aqueous composition,
    the crosslinking agent is formaldehyde,
    the polymerizable substance is phenol, and
    the catalyst is sodium hydroxide.

4. The wood product of claim 3, wherein the composite structure is a wood board, a wood veneer, or a wood bar.

5. The wood product of claim 3, wherein at least one layer of the two or more layers is a wood veneer layer.

* * * * *